Figure 1:
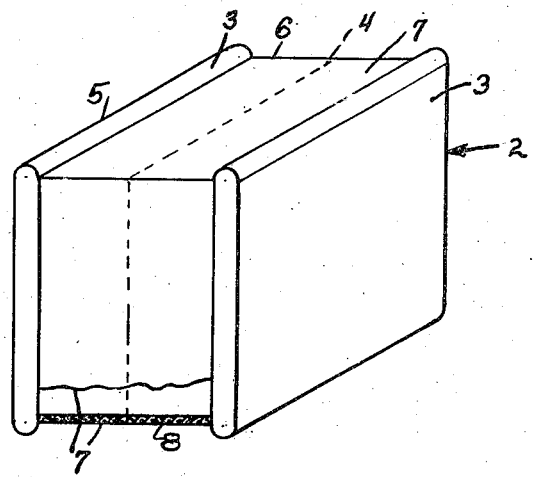

Nov. 9, 1943.     J. W. JORDAN     2,333,723
COMPOSITE BUILDING UNIT
Filed Jan. 23, 1941

Inventor
JOHN W. JORDAN.

By  Olen E. Bee
   Attorney

Patented Nov. 9, 1943

2,333,723

UNITED STATES PATENT OFFICE 2,333,723

COMPOSITE BUILDING UNIT

John W. Jordan, Port Allegany, Pa., assignor to Pittsburgh Corning Corporation, Allegheny County, Pa., a corporation of Pennsylvania Application January 23, 1941, Serial No. 375,551

4 Claims. (Cl. 72—37)

The present invention relates to construction units and more particularly to a composite building unit having a vitreous body.

One object of the invention is to provide a resilient edge coating for vitreous building units which not only permits formation of a satisfactory bond with ordinary masonry mortar, but also serves to relieve the units, when they are assembled in a wall structure, of stresses occasioned by volume changes due to variable conditions of temperature and humidity.

Other objects and advantages of my invention will become more apparent from the following detailed description of certain preferred embodiments thereof.

Hollow glass blocks have gained widespread recognition and are being specified by many architects and designers for modern constructions. They are especially suited for wall structures through which visibility is restricted but light may pass. These blocks are usually installed in buildings by setting in cement mortar to form monolithic panels. It is, however, very difficult to obtain a satisfactory bond between the mortar and the smooth non-absorptive surfaces of the blocks. As a consequence, many suggestions for improving the union of mortar and glass blocks have been considered and tried.

For example, it was proposed to groove or serrate the mortar-bearing edges of the blocks. Another thought was the provision of a flange which could be embedded in the mortar. Manufacturing and handling difficulties prevented adoption of these ideas. A more recent development entailed a coating of the mortar-bearing edges of the blocks with a granular material, various types of binders being employed. This procedure gave an improved mortar-bearing surface and bond, but failed to provide a bond which was satisfactory under all service conditions. Most recently, a combination of synthetic resins, particularly vinyl acetate and ethyl silicate, with or without a granular embedment has been used to form the bond coating.

It has been found, however, that the improvement in bond strengths now obtained creates a new problem, that of guarding against failures within the monolithic panels by reason of stresses generated by differential movements of the glass and mortar under changing conditions of temperature and humidity. These failures may appear either as broken glass units or as cracks in the mortar sections. It has been possible even with high bond values to eliminate to a great extent the stresses arising from temperature changes by matching the thermal coefficients of the glass and the mortar. A similar control over stresses resulting from moisture changes is not possible because the glass is non-hygroscopic while cement mortars are quite subject to volume expansion and contraction with varying conditions of humidity.

In an endeavor to overcome the problem of failures in service, further research has been carried on. Different compositions of glass from which the building units are formed have been tried. There has been a structural re-design of the units, and they have been accorded special heat treatments. Changes in and a more exact control over the mortar mixes have been followed. These developments have afforded substantial improvements in constructions employing glass blocks, but the desired goal has not yet been attained.

Briefly stated the present invention contemplates a solution of the foregoing difficulties by the application to the mortar-bearing edges of vitreous building units of a coating of a volumetrically compressible material to provide a cushion between the vitreous blocks and the mortar in which they are set, maintaining at the same time weather resistance and bond strength.

Figure 2:
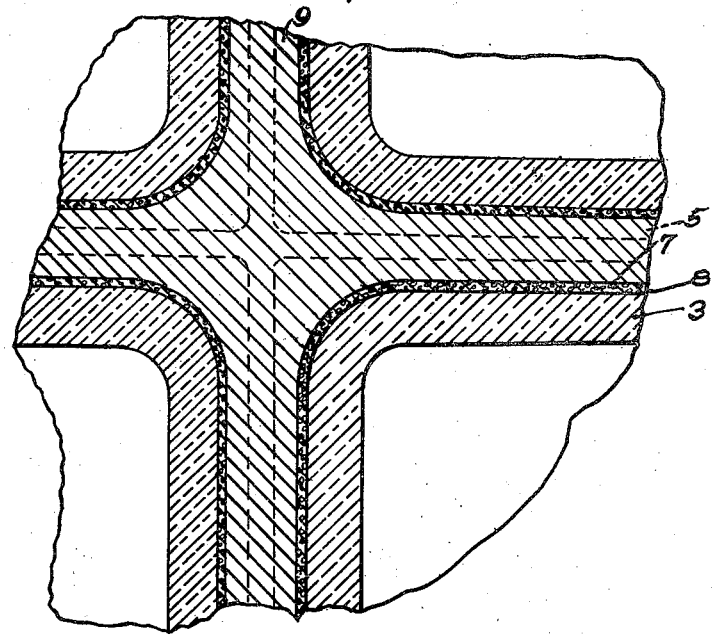

In the drawing, Figure 1 is an isometric view of a composite building unit embodying the features of my invention, showing portions of the edge coating broken away and Figure 2 is a fragmentary vertical sectional view of a wall constructed of the blocks.

Referring to the drawing, a building unit 2 is in the form of a hollow block and comprises symmetrical sections 3 of glass or other vitreous material united at 4 in any suitable manner. The edges of the unit are covered with a coating 7 of resilient material forming the desired mortar-bonding surface and protective "cushion" and having shoulders 5 defining a shallow edge channel or groove 6 to receive mortar when the blocks are laid up into the wall structure.

The coating 7 is composed of at least two layers of synthetic resins. The undercoat is preferably composed of a mixture of polyvinyl butyral resin and hydrolyzed ethyl silicate, a combination which adheres tenaciously to glass. The outer coat is formed of a resin of the polyvinyl acetal type, polyvinyl butyral resin being particularly suitable. The undercoat is most practically applied to the glass surfaces by a conventional spray process operating at normal temperatures. The second layer is preferably applied by a high-pressure spraying process operating at an elevated temperature. A solution, containing from 25 to 30% by weight of polyvinyl butyral resin dissolved in ethyl alcohol and heated to approximately 165° F., will have a sufficiently low viscosity to be handled in an air-gun.

The second layer formed by this process has dispersed therethrough minute gas bubbles 8 or cells. The presence of these cells increases materially the resilience and volumetric compressibility of the coating. By varying the concentration of the resin solution, the rate of drying, and other factors, it is possible to control the bubble formation and therethrough the volumetric compressibility of the cushioning layer. Experiments have demonstrated that it is entirely practical and economical to obtain cells constituting approximately 50% of a layer of from 0.010 to 0.015 of an inch in thickness.

The blocks are laid up in edge to edge relation to form a wall in a conventional manner with mortar or cement 9 in the channels 6 to bond contiguous blocks together.

While the foregoing is the present preferred method of obtaining a resilient coating of the required type, a similar volumetric compressibility may be obtained by dispersing finely divided cork, sponge rubber, or other cellulated material through the resin coating. Though these fillers will provide volumetric compressibility they are not quite so desirable from the standpoint of cost and appearance.

It will at once be obvious that various modifications in the composition of the coating layer and the formation of my composite building unit are possible without departing from the spirit of the invention or the scope of the appended claims.

What I claim is:

1. A building block of glass having spaced marginal shoulders defining a shallow channel about the edges thereof for reception of mortar in a joint formed between it and a contiguous block when it is laid up with similar blocks in a building wall, the surface defining the bottom of the channel between the shoulders being coated with a layer of plastic which is highly cellulated to render it volumetrically compressible so that it will yield under the forces created by changes of volume in the mortar in said joint.

2. A building wall comprising glass blocks laid up with mortar joints therebetween, said blocks having spaced marginal shoulders defining channels therebetween for reception of the mortar, the surfaces defining the bottoms of each of the channels being coated with an adherent layer of plastic, which is sufficiently cellulated to impart thereto volumetric compressibility to relieve stresses exerted upon the blocks due to volume changes in the mortar without rupture of the blocks.

3. A building wall comprising a plurality of glass blocks laid up with mortar joints therebetween, said blocks having spaced marginal shoulders defining channels about their perimeters for the reception of the mortar, the surfaces defining the bottom of each of the channels being coated with an adherent layer of vinyl acetal resin, the resin being cellulated to relieve stresses exerted upon the blocks due to volume of changes in the mortar.

4. A building wall comprising a plurality of glass blocks laid up in edge to edge relation with mortar providing a bond in the joints therebetween, said blocks having spaced marginal shoulders defining channels about the perimeters thereof for reception of the mortar, the surfaces defining the bottoms of the channels being coated with polyvinyl butyral resin having gas cells dispersed therethrough to impart thereto resilience to relieve stresses exerted upon the blocks due to volume changes in the mortar.

JOHN W. JORDAN.